(No Model.)
I. H. ATHEY.
CORN DROPPING ATTACHMENT.
No. 276,151. Patented Apr. 24, 1883.
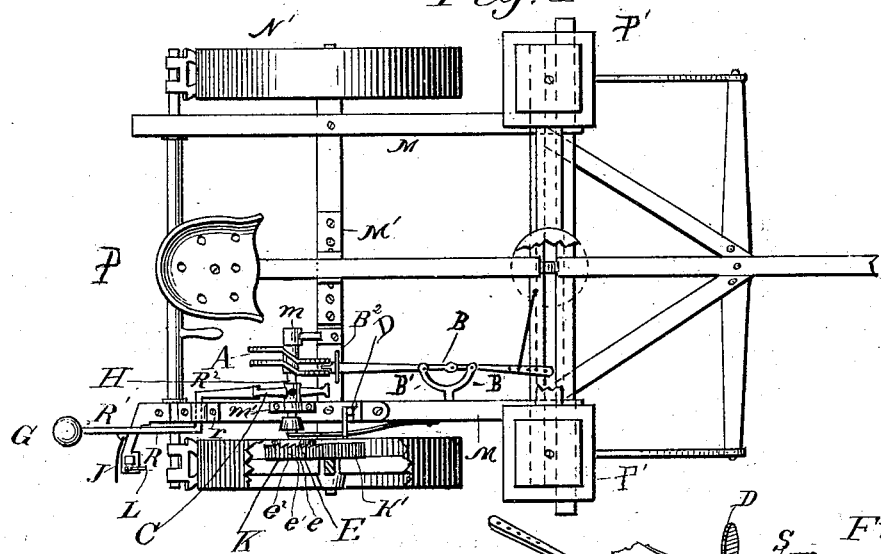
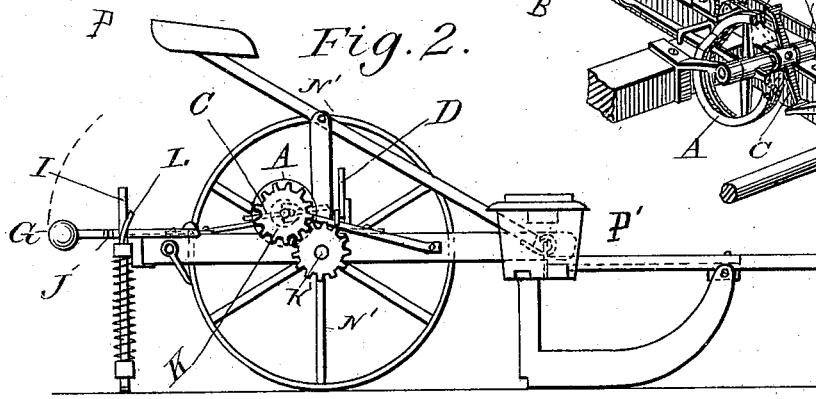
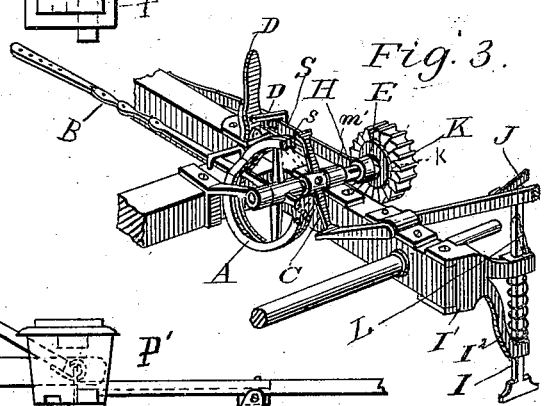
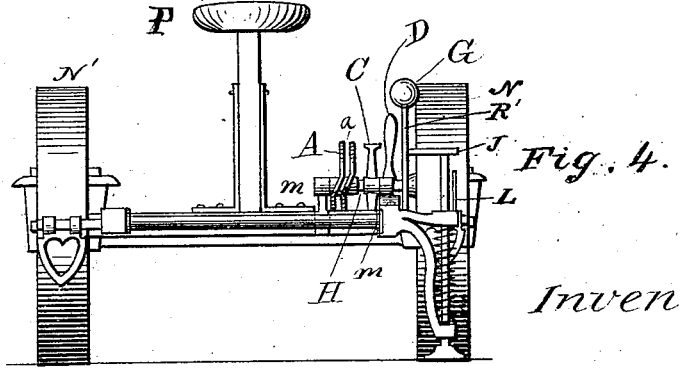
Witnesses:
E. L. Copeland
T. N. Athey
Inventor:
Isaac H. Athey

UNITED STATES PATENT OFFICE.

ISAAC H. ATHEY, OF PAOLA, KANSAS.

CORN-DROPPING ATTACHMENT.

SPECIFICATION forming part of Letters Patent No. 276,151, dated April 24, 1883.

Application filed April 12, 1882. (No model.)

*To all whom it may concern:*

Be it known that I, ISAAC H. ATHEY, a citizen of the United States, residing at Paola, county of Miami, and State of Kansas, have invented certain new and useful Improvements in Corn-Planter Attachments; and I do hereby declare the following to be a full, clear, and exact description of the invention, such as will enable others skilled in the art to which it appertains to make and use the same.

My invention relates to that class of machines known as "corn-dropping and check-row attachments."

The object of my invention is to produce a device which will automatically operate the dropping and impressing parts.

The invention consists of parts and combination of parts, all as will be hereinafter described and claimed, reference being had to the accompanying drawings, in which—

Figure 1 represents a top plan view of the planter; Fig. 2, a side elevation with the right planter-wheel detached; Fig. 3, a detail view of the attachment, and Fig. 4 a rear elevation of the planter.

M represents the frame of the planter, mounted upon wheels N N', and carrying the seat P and dropping attachment P' P'. Upon the axle and within the wheel N' is fixed a gear-wheel, K'. Upon the shaft M' is attached a sleeve, $m$, for supporting one end of a shaft, H, which carries the cam A, wiper C, and thimble E, and is journaled between the thimble and wiper at $m'$. Upon its outer end is journaled a loose gear-wheel, K, meshing with fixed gear-wheel K', and having ratchet-teeth $k$ on its inside. The cam A is provided with a peripheral slot, $a$, in which the end of the dropper B projects. This bar is jointed at or near its middle, and is supported by arms B', and its front end is connected to the slide-bar of the dropping device. The back part of bar B rests upon axle M', and is held in place by a strap, B², which forms a slot for the bar to work in when the cam A is revolved.

The wiper C is fixed to the shaft by a set-screw, so that it can be shifted to strike the crank-arm of the impression-lever at any predetermined moment, as will hereinafter be set forth.

Attached to the rear end of one of the side pieces, M, is a bracket, I', having vertical openings for the impressor I to move in. This impressor projects above and below the bracket I, and is held in place by a spring, I², which also draws the lower end of the impressor from the ground when the weight is removed from the upper end. Upon the upper side of the bracket is a post, L, having its upper end projecting in front of the upper part of impressor I and inclined backward, so that its base will be parallel or nearly parallel to the rear side of said impressor, for a purpose that will hereinafter be described.

Pivoted upon the same beam as and in front of bracket I' is an angle-lever, R, secured in place by a strap, $r$. The front arm, R², of this lever is within the frame, upon the same line as the wipers C, which alternately strike and depress it. The rear arm is upon the outside of the frame and extends beyond the bracket I'. Upon the extreme end is a weight, G, which, when the wiper C has depressed and passed the arm R², elevates the latter, so that the wiper in revolving will again depress the arm R². When the arm R² is depressed the arm R' is elevated to a point above the upper end of impressor I, so that the spring J will rest upon the top of the latter. After the wiper releases the arm R² the weight G forces the arm R', spring-arm J, and the impressor I downwardly until the spring-arm J comes in contact with the inclined post L, which forces said arm J from the top of the impressor and allows the spring I² to force the impressor in position for another blow of the spring-arm J.

The thimble E revolves with shaft H, but moves longitudinally thereon by means of a feather, which engages with the walls of a longitudinal groove in said shaft; or the feather and groove may be reversed. The outer end of the thimble is provided with ratchet-teeth $e$, which engage with the ratchet-teeth $k$ on wheel K when the thimble is moved outwardly upon the shaft. When the ratchet-teeth are so engaged motion is imparted to shaft H, which revolves the cam A and wipers C. To move the thimble a strap-spring, S, is attached by one end to the planter-frame and by the other to a neck, $e'$, on thimble E. The rear side of the ratchet-wheel $e$ serves as a bearing when the thimble is to be pushed outwardly, and a collar, $e^2$, for a bearing when the thimble is to be drawn away from wheel K. The collar $e^2$ also serves as a stop by striking against the strap $m'$ and prevents the spring S from drawing the thimble back too far. To operate the spring a lever, D, having an outwardly-projecting pivoted angle iron, D', provided with fingers which embrace the sides of the spring and draw the latter in or out when the lever is moved inwardly or outwardly, is pivoted to the frame at a point forward of the seat, so that the driver can operate the parts without changing his position.

The operation is as follows: The driver adjusts the cam or the wipers one by the other, so that the impressor will strike exactly upon the spot where the corn has been dropped. He then throws lever D D' to the right, which forces, by means of spring S, the ratchet-face $e$ of thimble E against the ratchet-face $k$ in wheel K. This may be done while the planter is moving or stationary. When the ratchet has become meshed and the planter moved, the cog-wheel K' moves cog-wheel K, which in turn imparts its motion to the thimble E and shaft H. The cam A oscillates the bar B and moves the dropper-slide, and the wipers C alternately elevate and depress the rear arm, R', of lever R, which, by means of spring-arm J, forces impressor I downwardly. When the spring-arm strikes the inclined post it is thrown off, and the impressor is forced up, ready for a new stroke from the lever R, which is elevated by one of the wipers C. To disconnect the dropping and impressing parts, the lever D D' is moved to the left, which draws the thimble E from the gear-wheel K, and thus permits the planter to be moved without operating either the dropping or impressing parts.

If desired, the impressor may be disconnected by shifting the wipers to one side of the lever R; or the dropping mechanism may be disconnected by shifting the bar B in such a manner as to disconnect it from cam A.

What I claim as new is—

1. In a corn-planter, the combination of a shaft, H, having wiper C, a bracket, I', having inclined post L, impressor I, having spring $I^2$, and a lever, R, having arms R' $R^2$ and spring-arm J, for the purpose substantially as set forth.

2. In a corn-planter, the combination of a shaft having a cam and a wiper, a dropper having a bar operated by said cam, and an impressor having spring $I^2$, a bracket for supporting said impressor, and having an inclined post, L, and a lever operated by said wiper, and having a spring-arm, J, all arranged substantially as described, and for the purpose set forth.

In testimony of which invention I hereunto set my hand.

ISAAC H. ATHEY.

Witnesses:
 E. L. COPLAND,
 T. N. ATHEY.